US008693352B2

(12) United States Patent
Lindoff et al.

(10) Patent No.: US 8,693,352 B2
(45) Date of Patent: Apr. 8, 2014

(54) METHOD AND APPARATUS FOR ARQ CONTROL IN WIRELESS COMMUNICATIONS

(75) Inventors: Bengt Lindoff, Bjärred (SE); Matthias Kamuf, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1077 days.

(21) Appl. No.: 12/638,451

(22) Filed: Dec. 15, 2009

(65) Prior Publication Data

US 2011/0002278 A1 Jan. 6, 2011

Related U.S. Application Data

(60) Provisional application No. 61/222,776, filed on Jul. 2, 2009.

(51) Int. Cl.
*H04B 7/185* (2006.01)
*H04L 12/26* (2006.01)
*H04W 4/00* (2009.01)

(52) U.S. Cl.
USPC .......................................... 370/252; 370/329

(58) Field of Classification Search
None
See application file for complete search history.

(56) References Cited

U.S. PATENT DOCUMENTS

| | | | |
|---|---|---|---|
| 2005/0032536 A1* | 2/2005 | Wei et al. ...................... | 455/517 |
| 2006/0133290 A1* | 6/2006 | Lindoff et al. ................. | 370/252 |
| 2007/0242652 A1* | 10/2007 | Dahlman et al. ............... | 370/342 |
| 2008/0155371 A1* | 6/2008 | Mauritz et al. ................ | 714/748 |
| 2009/0103498 A1* | 4/2009 | Nilsson et al. ................ | 370/336 |
| 2009/0268685 A1* | 10/2009 | Chen et al. .................... | 370/329 |

FOREIGN PATENT DOCUMENTS

| WO | 2005055485 A2 | 6/2005 |
|---|---|---|
| WO | 2006031177 A1 | 3/2006 |
| WO | 2007028279 A1 | 3/2007 |

OTHER PUBLICATIONS

Panasonic (3GPP TSG-RAN WG1 Meeting #51 R1-074928), UL HARQ behaviour with dynamic adaptive/non-adaptive opertion, Nov. 2007, all pages.*
3rd Generation Partnership Project. 3GPP TS 36.101, V8.4.0 (Dec. 2008). 3rd Generation Partnership Project; Technical Specification Group Radio Access Network; Evolved Universal Terrestrial Radio Access (E-UTRA); User Equipment (UE) radio transmission and reception (Release 8). Dec. 2008.
3rd Generation Partnership Project. 3GPP TS 36.211, V8.5.0 (Dec. 2008). 3rd Generation Partnership Project; Technical Specification Group Radio Access Network; Evolved Universal Terrestrial Radio Access (E-UTRA); Physical Channels and Modulation (Release 8). Dec. 2008.

(Continued)

*Primary Examiner* — Chirag Shah
*Assistant Examiner* — Srinivasa Reddivalam
(74) *Attorney, Agent, or Firm* — Coats and Bennett PLLC

(57) ABSTRACT

In one or more aspects, the method and apparatus presented herein consider corresponding uplink resource allocations when allocating ARQ signal powers. In particular, in at least one embodiment, more power is allocated to the acknowledgment ("ack") signal(s) corresponding to user equipment (UE) transmissions that involve larger allocations of uplink resources. For the example context of an LTE network, an eNodeB "boosts" its ack signaling power for acknowledging UE transmissions associated with larger uplink bandwidth allocations. Additionally, or alternatively, the UE is configured to bias its ARQ signal evaluations, to bias its ack/nack decision determinations to favor the ack decision, at least for those acks associated with transmissions that used greater resource allocations.

18 Claims, 7 Drawing Sheets

(56) References Cited

OTHER PUBLICATIONS

3rd Generation Partnership Project. 3GPP TS36.213, V8.5.0 (Dec. 2008). 3rd Generation Partnership Project; Technical Specification Group Radio Access Network; Evolved Universal Terrestrial Radio Access (E-UTRA); Physical layer procedures (Release 8). Dec. 2008.

3rd Generation Partnership Project. "PHICH Detection Thresholding." 3GPP TSG-RAN WG4 #47bis, R4-081306, Munich, Germany, Jun. 16-20, 2008.

3rd Generation Partnership Project. "Way Forward on PHICH Demodulation Performance Requirements." TSG-RAN Working Group 4 Meeting #47bis, R4-081444, Munich, Germany, Jun. 16-20, 2008.

3rd Generation Partnership Project. "Framework for the LTE UE Demodulation Requirements (Revision 6)." TSG RAN WG4 meeting #49bis, R4-090188, Ljubljana, Slovenia, Jan. 12-16, 2009.

Lindoff, B. et al.. "Improved Signal Reception in Wireless Communication Systems using Automatic Repeat Request Transmissions." U.S. Appl. No. 12/635,304, filed Dec. 10, 2009.

* cited by examiner

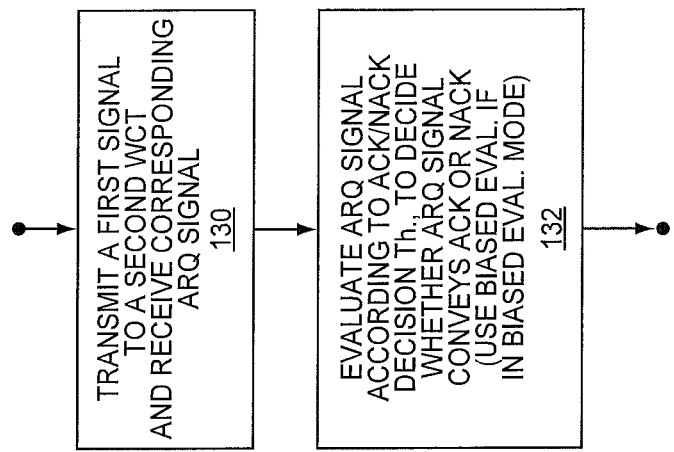
FIG. 9
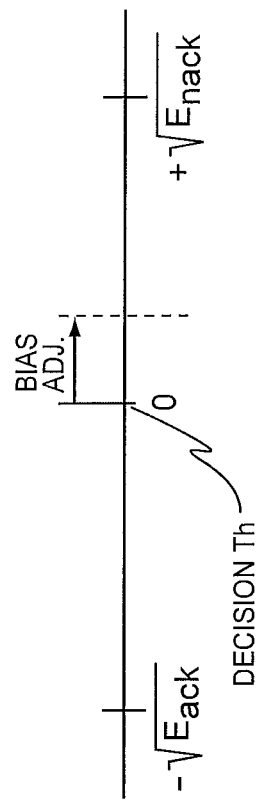
FIG. 10
FIG. 11

METHOD AND APPARATUS FOR ARQ CONTROL IN WIRELESS COMMUNICATIONS

RELATED APPLICATIONS

This application claims priority from the U.S. provisional patent application filed on 2 Jul. 2009, and now assigned App. No. 61/222,776.

BACKGROUND

Wireless communication networks of various types use forms of Automatic Repeat reQuest (ARQ) response signaling. With ARQ, transmissions from a given transmitter are acknowledged or not acknowledged, depending on whether they are successfully received. Non-acknowledgments prompt the transmitter to retransmit using, for example, the same channel resources that were allocated for its original transmission.

According to the Long Term Evolution (LTE) standards, as promulgated by the Third Generation Partnership Project (3GPP), LTE networks use Hybrid ARQ (H-ARQ). As an example, given mobile terminals or other types of User Equipment (UE) transmit to an eNodeB in one or more LTE subframes, according to uplink assignment grants made by the eNodeB. An assignment grant allocates particular OFDM channel resources to particular users. Thus, in ongoing operation, the eNodeB receives some number of user signals in each of a series of repeating LTE subframes, and sends ARQ responses to each transmitting user, in dependence on whether that user's signal was successfully received (decoded) by the eNodeB.

In more detail, in 3GPP Release 8, for LTE, an eNodeB sends an H-ARQ response signal on the Physical H-ARQ Indicator Channel (PHICH), wherein an acknowledgment response—sometimes referred to as an "ack"—indicates that the user signal transmitted on the uplink to the eNodeB by a given User Equipment (UE) was successfully decoded. Conversely, a non-acknowledgment response—sometimes referred to as a "nack"—indicates that the user signal was not successfully decoded.

In Frequency-Division Duplexing (FDD) mode, the eNodeB receives some number of user signals in a given LTE subframe, and sends ARQ response signals corresponding to those signals four subframes later, as a PHICH group transmitted on the PHICH. The determination of the PHICH group, as well as the different spreading sequences used to differentiate the different ARQ responses by targeted UEs, is determined based on the locations of the corresponding uplink assignments used for the transmissions being acknowledged. The PHICH is mapped on OFDM symbol "0" for normal durations, or 0, 1, and 2 for extended durations.

To efficiently utilize the available resources, the ARQ signals for up to eight UEs can be multiplexed into a single PHICH group, and there are several such PHICH groups available. The number of PHICH groups depends on the system bandwidth and a semi-static parameter called Ng, to dynamically account for changes in the number of users. There are at least 2 PHICH groups (1.4 MHz and Ng=1/6) and at most 25 (20 MHz and Ng=2) present in the control region of a subframe.

In forming a given PHICH group at the eNodeB, single-bit acks/nacks are coded by a (3, 1) repetition code. To be able to distinguish the different users upon decoding, each UE is assigned a spreading sequence that is orthogonal to the other sequences in a spreading book. Because the spreading factor is four, for the case of normal cyclic prefix, every bit is expanded into four bits, and thus the total number of bits per ack/nack is 12. These bits are mapped onto complex modulation symbols using Binary Phase Shift Keying (BPSK). The fact that the UEs share the energy within one PHICH group allows the eNodeB to carry out power control to balance the decoding performance of the assigned UEs. That is, the eNodeB can allocate ARQ signaling power within the PHICH group in view of the different received signal qualities (e.g., different signal-to-noise ratios or SNRs) at the UEs.

In particular, the eNodeB applies a different amplitude scaling factors to the ARQ signals targeted to different UEs—e.g., for UEs 0 to 7, the eNodeB uses scaling factors $G_0$ to $G_7$ to set the ARQ signal power allocations within the PHICH group, where $G_i = \sqrt{E_{b_i}}$.

The resulting signal for transmission of a PHICH group can thus be written as $$s = [s_0 \ldots s_{11}]^T, \qquad (Eq. 1)$$

with $$s_k = \sum_{i=0}^{7} G_i \cdot w_i(k \bmod 4) \cdot e^{j\pi/4 - jb\pi}, \qquad (Eq. 2)$$

where b maps to ACK (b=1) or NACK (b=0). Note that the $s_k$ are mapped onto different resource elements (REs) in the OFDM time-frequency grid of the control region in a given subframe.

For notational simplicity, assume one transmit antenna at the eNodeB and M receiver antennas at the UE. The model of one received RE after the Fast Fourier Transform (FFT) is $$r_k = h_k \cdot s_k + n_k, \qquad (Eq. 3)$$

where $r_k$, $h_k$, and $n_k$ are (M×1) column vectors. The channel experienced by RE k is described by $h_k$, and $n_k$ CN $(0, N_0)$ is a complex Gaussian noise vector and CN is the complex norm. The Maximum Ratio Combining (MRC) solution for $s_k$ becomes $$\hat{s}_k = h_n^H \cdot r_k = \|h_k\|^2 \cdot s_k + h_k^H \cdot n_k, \qquad (Eq. 4)$$

By normalizing with the channel gain, one obtains $$\hat{s}_k = s_k + \frac{h_k^H \cdot n_k}{\|h_k\|^2}. \qquad (Eq. 5)$$

With knowledge (estimation) of h and the distribution of n, the distribution for the detected symbol $\hat{s}$ at the UE is $$\hat{s}_k \sim CN\left(s_k, \frac{N_0}{\|h_k\|^2}\right). \qquad (Eq. 6)$$

The decision variable hi for the decoding the ARQ signal inside a PHICH group, for a specific UE i, over the RE [0, . . . , 11] is derived by $$hi = \sum_{k=0}^{11} e^{-j\pi/4} \cdot w_i^*(k \bmod 4) \cdot \hat{s}_k, \qquad (Eq. 7)$$

where the rotation is applied to map the received signal onto the real axis. The complex conjugate of the UE's spreading sequence w, is applied to cancel the contribution from the other UEs. For example, for a real spreading sequence, one can write $$hi = \sum_{k=0}^{11} \text{Re}\{e^{-j\pi/4} \cdot w_i^*(k \bmod 4) \cdot \hat{s}_k\}. \quad \text{(Eq. 8)}$$

As such, the UE may take a decision on whether the signal is an ack or a nack according to $$\hat{b}_i = \begin{cases} 0 & \text{if } hi \geq 0 \\ 1 & \text{if } hi < 0 \end{cases}. \quad \text{(Eq. 9)}$$

Notably, however, from a system point of view, there may be different Block Error Rate (BLER) requirements for PHICH decoding, depending on whether an ack or a nack was sent. Consider, for example, the case where, at a given UE, an ack is mistaken for a nack. In this case and if there is not an explicit uplink grant read on the Packet Data Control Channel (PDCCH), the UE will retransmit the apparently non-acknowledged packet using the same uplink resources that were reserved for its original transmission. However, because the eNodeB successfully received the packet, it may have allocated those resources to another UE (or UEs). Thus, the erroneous retransmission, caused by the UE incorrectly interpreting the eNodeB's ack as a nack, causes interference at the eNodeB.

In the other case, the UE mistakes a nack as an ack. This mistake is not as critical from a system standpoint, because the UE simply fails to retransmit and clears its packet buffer; no interference with other uplink transmissions occurs. Of course, a retransmission request has to be taken care of by higher control layers, but these operations only add latency to the retransmission. Therefore, the requirement for Pr{ack→nack} (the probability of ack misinterpreted as nack) is more restrictive than Pr{nack→ack}.

The 3GGP TSG RAN WG 4 defined a test requirement as the smallest SNR where Pr{ack→nack}=$10^{-3}$ is fulfilled. Accordingly, inside a given PHICH group, power must be distributed such that each UE targeted by the PHICH achieves the probability target. As a reasonable simplification, one may assume that the contributions of the UEs, are decoupled such that the power level of each ARQ signal within a given PHICH group can be set as if no other UE was present.

For a single UE in a PHICH group, from considerations of the probability density functions of a random Gaussian variable, an ack requires almost twice the power to maintain unequal error probabilities, if the decision threshold is located at zero. Given that a UE transmits at a BLER of ten percent, this fact means that acks are sent ninety percent of the time. The likelihood that most or all of the ARQ responses being sent in a given PHICH group will be acknowledgements and the reliability targets for sending those acknowledgments can result in the need for relatively high power allocations at the eNodeB for PHICH group transmissions.

SUMMARY

In one or more aspects, the present invention considers corresponding uplink resource allocations when allocating ARQ signaling powers. In particular, in at least one embodiment, more power is allocated to the acknowledgment ("ack") signal(s) corresponding to UE transmissions that involve larger allocations of uplink resources. For the example context of an LTE network, an eNodeB "boosts" its ack signaling power for acknowledging ("acking") UE transmissions associated with larger uplink bandwidth allocations. Additionally, or alternatively, the UE is configured to bias its ARQ signal evaluations, to favor the ack decision, at least for those acknowledgments associated with transmissions that used greater resource allocations.

Accordingly, one embodiment of the teachings presented herein provide a method of transmitting ARQ signaling from a wireless communication transceiver to respective ones in a plurality of remote transceivers. The method comprises: receiving and decoding signals from given ones of the remote transceivers and decoding them; generating nack signals for those received signals that failed decoding and ack signals for those received signals that passed decoding; setting a transmit power level for at least one of the ack signals based at least in part on the amount of channel resources allocated for transmission of the corresponding received signal; and transmitting the ack and nack signals.

As a non-limiting example, the wireless communication transceiver is included in an eNodeB in an LTE network that receives data signals from LTE terminals according to uplink resource allocations scheduled by the eNodeB. Correspondingly, the ARQ signals (i.e., the ack and/or nack signals) are coded signals within a PHICH group, wherein the group includes ARQ signals targeted to one or more of the LTE terminals. Still further, setting the power level for at least one of the ack signals comprises, for example, determining a nominal or targeted ack power according to defined error probability targets, and then boosting the power higher, in dependence on the amount of uplink resources that were allocated to the transmission being acknowledged.

Another embodiment provides a wireless communication transceiver for operation in a wireless communication network. The transceiver comprises: receiver circuits configured to receive signals from given ones in a plurality of remote transceivers; decoding circuits configured to decode the received signals; a retransmission control circuit configured to generate nack signals for those received signals that failed decoding and ack signals for those received signals that passed decoding; a power control circuit configured to set a transmit power level for at least one of the ack signals based at least in part on the amount of channel resources allocated for transmission of the corresponding received signal; and transmitter circuits configured to transmit the ack and nack signals. Again, by way of non-limiting example, the transceiver may be included in an eNodeB configured for operation in an LTE network.

Yet another embodiment provides a method of ARQ signal detection in a first wireless communication transceiver, which, for example, is included in an LTE terminal or other UE. The method comprises: transmitting a first signal to a second wireless communication transceiver and receiving a corresponding ARQ signal in return; evaluating the ARQ signal according to an ack/nack decision threshold, to decide whether the ARQ signal conveys an acknowledgment (ack) or a non-acknowledgment (nack); and, when operating in a biased decision mode, selectively biasing said step of evaluating toward the ack decision, in dependence on the amount of channel resources that were allocated to transmission of the first signal.

In a corresponding apparatus embodiment, a first wireless communication transceiver comprises: a transmitter configured to transmit a first signal to a second wireless communication transceiver and a receiver configured to receive a corresponding ARQ signal in return. The transceiver further includes a control circuit configured to: evaluate the ARQ signal according to an ack/nack decision threshold, to decide whether the ARQ signal conveys an ack or a nack; and, when operating in a biased decision mode, selectively bias its ARQ signal evaluation toward the ack decision, in dependence on the amount of channel resources that were allocated to transmission of the first signal.

Of course, the present invention is not limited to the above summarization of features and advantages. Those skilled in the art will appreciate additional features and advantages in view of the following detailed description of example embodiments, and upon review of the accompanying drawings.

BRIEF DESCRIPTION OF THE DRAWINGS

FIG. 9 is a block diagram of one embodiment of a biasing circuit, used for biasing the ack decision by adjusting the ack/nack symbol detection statistic.

FIG. 10 is a plot of one embodiment of an ack/nack decision scale, wherein the ack/nack decision threshold is adjustable, for ack decision biasing.

FIG. 11 is a logic flow diagram of one embodiment of a method of ack decision biasing.

DETAILED DESCRIPTION

Figure 1:
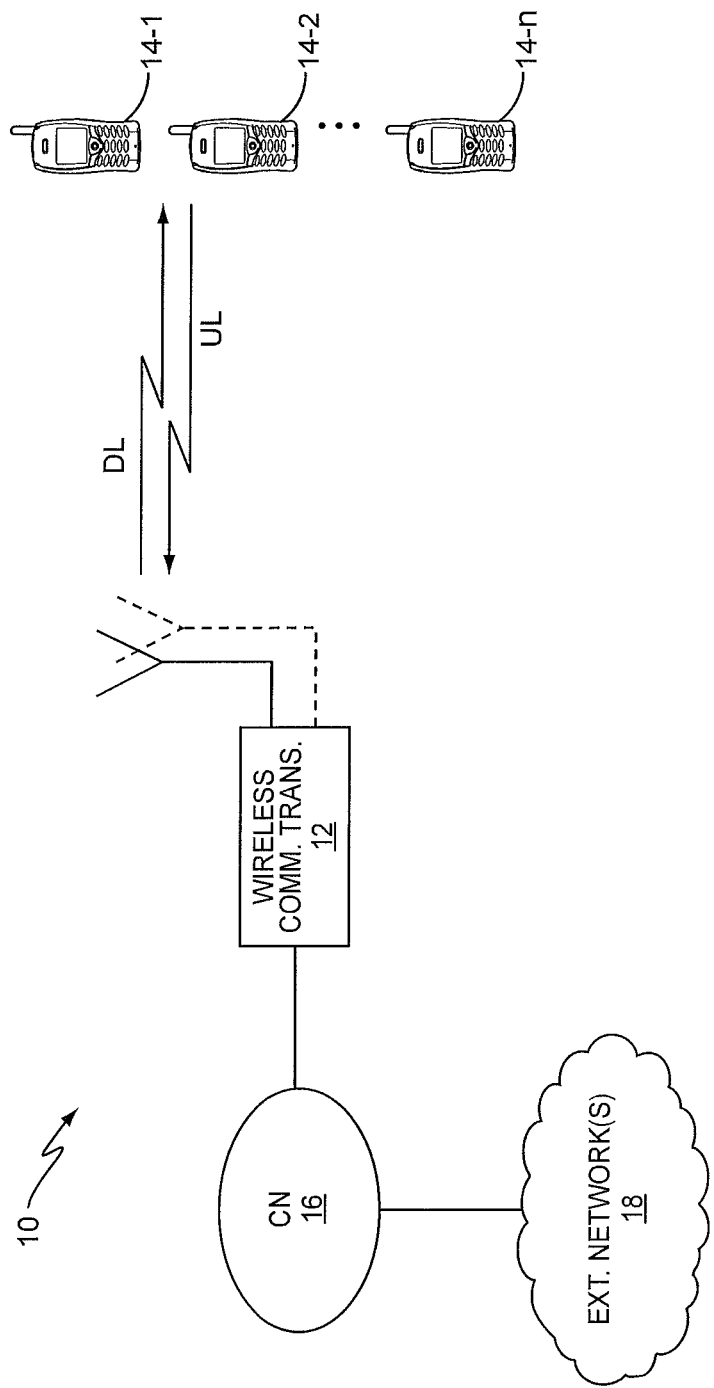
FIG. 1 is a block diagram of one embodiment of a wireless communication network, wherein a second transceiver sends ARQ signaling (ack/nack signals) responsive to receiving transmissions from one or more (remote) first transceivers.

FIG. 1 provides a simplified illustration of one embodiment of a wireless communication network 10 that includes a wireless communication transceiver 12 that transmits ARQ signaling to remote transceivers 14. The network 10, which, as a non-limiting example, comprises an LTE network, further includes a core network 16 that includes multiple communication, control, and authentication entities, and communicatively couples the network 10 to one or more external networks 18, such as the Internet.

The wireless communication transceiver 12 is configured to perform a method of transmitting ARQ signaling to respective ones in a plurality of remote transceivers 14. Note that the remote transceivers are individually distinguished, when necessary for clarity of discussion, using suffixes, such as 14-1, 14-2, and so on. However, the reference number 14 is used generically for singular and plural references to the remote transceivers.

Figure 2:
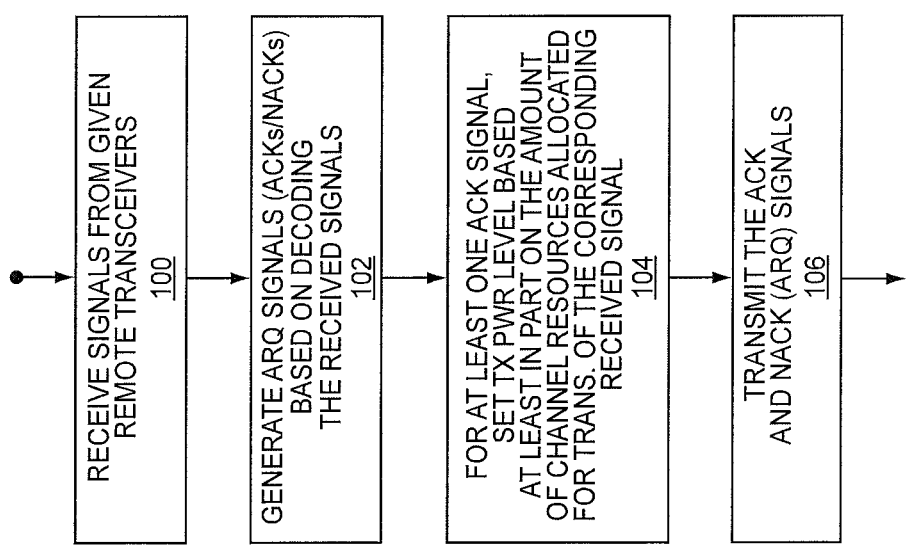
FIG. 2 is a logic flow diagram of one embodiment of a method for ARQ signal generation, wherein (selective) ack power boosting is used to enhance the reliability of higher-risk acks.

With reference to FIG. 2, the method comprises receiving signals (at the transceiver 12) from given ones of the remote transceivers 14 and decoding them (Block 100). Further, the method includes generating non-acknowledgment (or "nack") signals for those received signals that failed decoding and acknowledgment (or "ack") signals for those received signals that passed decoding (Block 102). The method further includes setting a transmit power level for at least one of the ack signals based at least in part on the amount of channel resources allocated for transmission of the corresponding received signal (Block 104). Still further, the method includes transmitting the ack and nack signals, where ack signals are sent for those received signals being acknowledged and nack signals are sent for those received signals being non-acknowledged (Block 106).

With reference to the diagram, the signals being acknowledged and non-acknowledged by the transceiver 12 are transmitted by individual ones of the transceivers 14 on a wireless communication uplink (UL), according to uplink resource allocations, such as the physical resource blocks in an LTE system. These uplink resource allocations are scheduled or otherwise managed by the transceiver 12. In turn, the ARQ signals, for acknowledging and/or non-acknowledging the signals received from individual ones of the transceivers 14, are transmitted by the transceiver 12 on a wireless communication downlink (DL).

In at least one embodiment of the above method, the setting step comprises setting the transmit power level to a nominal level if the amount of channel resources allocated for transmission of the corresponding received signal is below a defined allocation threshold, and setting the transmit power level to a boosted level if the amount of channel resources allocated for transmission of the corresponding received signal is above the defined allocation threshold.

As an example, the "nominal" power level is calculated according to currently-estimated channel conditions for the associated remote transceiver and a reception reliability requirement defined for ack signals. The boosted level is therefore "boosted" in the sense that it is greater than the nominal level that the defined ack reception reliability requirements would dictate, for the current channel conditions. Thus, in one or more embodiments, the method includes calculating the nominal level as a function of a known reception reliability requirement for ack signals and currently-estimated propagation channel conditions, and calculating the boosted level by upwardly adjusting the nominal level.

Further, in at least one embodiment, the setting step comprises setting nominal transmit power levels for the ack signals corresponding to those received signals that had channel resource allocation amounts below a defined threshold amount, and setting boosted transmit power levels for one or more of the ack signals corresponding to those received signals that had channel resource allocation amounts above the defined threshold amount.

Figure 3:
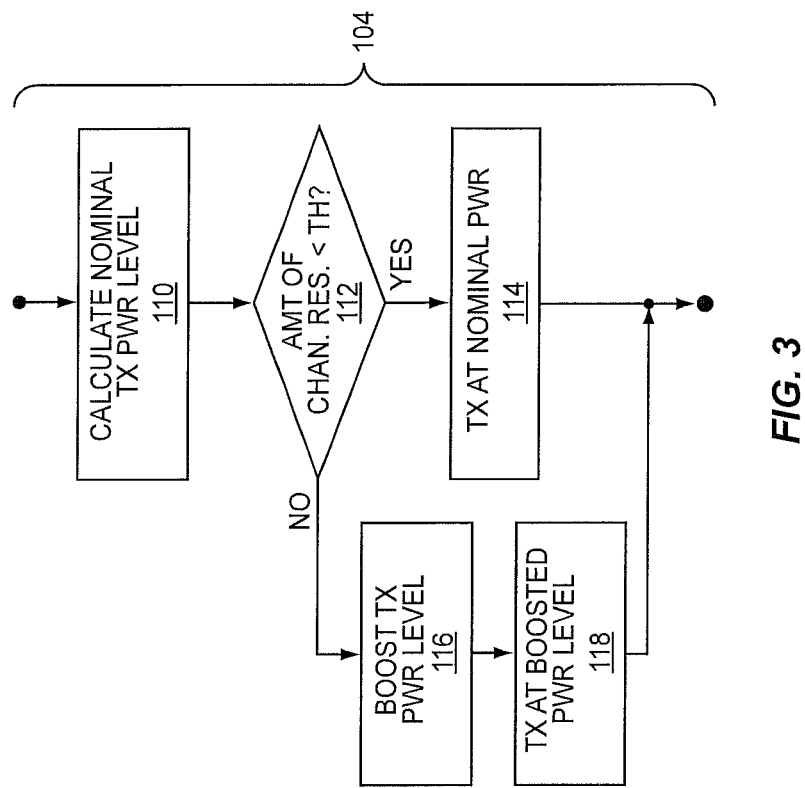
FIG. 3 is a logic flow diagram of one embodiment of a method for boosting ack powers.

FIG. 3 provides an example of the ack power setting step, which begins with calculating a nominal transmit power level for a given ack signal (Block 110), and determining whether the amount of channel resources that were allocated to the signal being acknowledged is below some defined threshold resource amount (Block 112). If so, the ack signal is transmitted at the nominal power level—i.e., not boosted. If not, the ack signal transmit power level is boosted (Block 116), and transmitted at the boosted level (Block 118).

Thus, a given ack signal is boosted if the resource allocation made for the corresponding transmission—i.e., the one being acknowledged—was above a threshold allocation amount. Here, "amount" may be measured in terms of bandwidth allocation. As an example, the "amount" of resource allocation may be expressed in terms of the number of OFDM resource element/resource block allocations, etc.

In a particular example, the transceiver 12 comprises an eNodeB operating in an LTE network and the remote transceivers 14 comprise user terminals transmitting user signals to the eNodeB on subframes of a Physical Uplink Shared Channel (PUSCH). Here, the method's receiving step comprises, for a given subframe of the PUSCH, receiving and decoding given user signals, and the setting step comprises setting the transmit power levels for a corresponding group of ack signals, to be sent by the eNodeB on a Physical Hybrid-ARQ Indicator Channel (PHICH).

Figure 4:
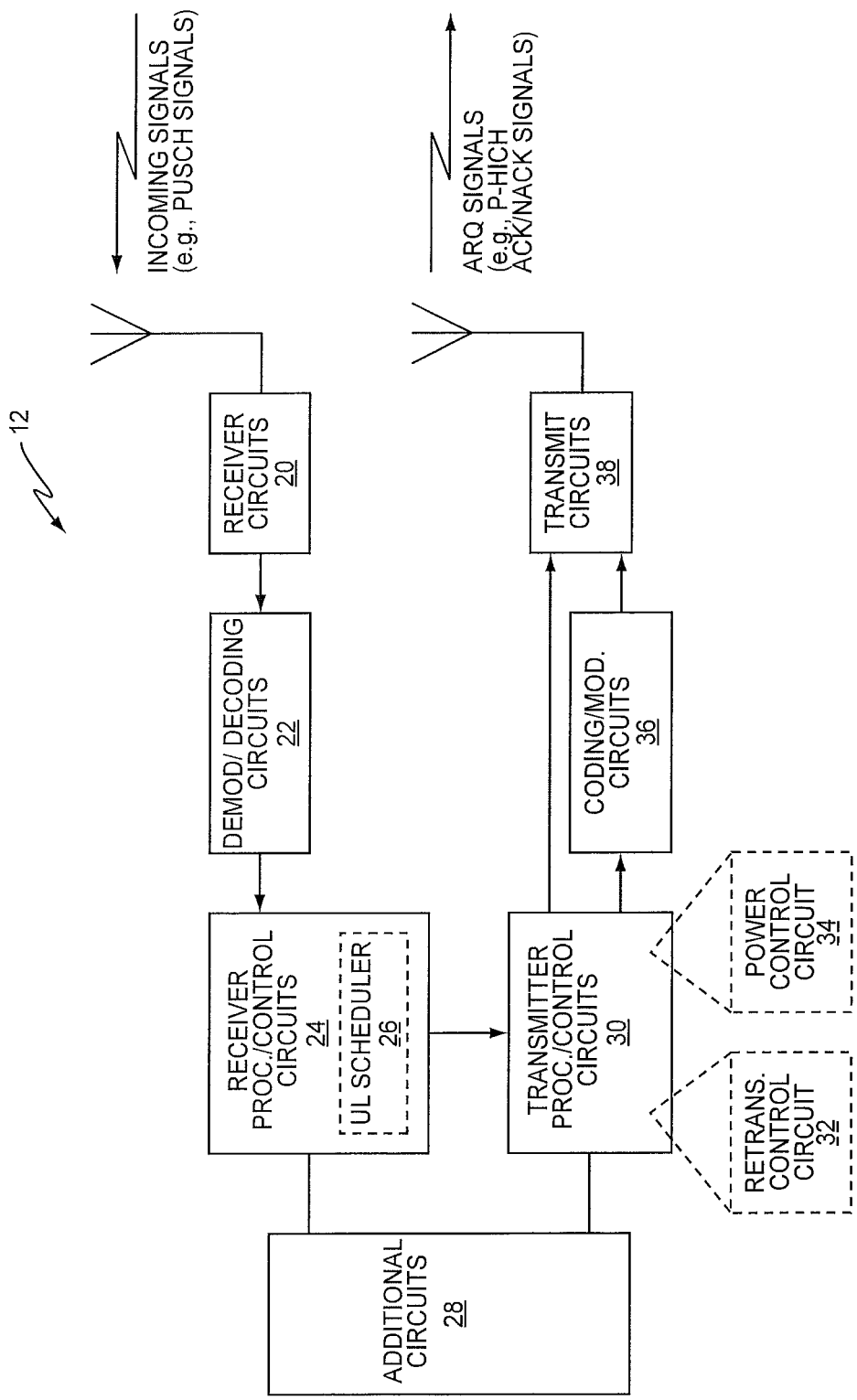
FIG. 4 is a block diagram of one embodiment of a network node, such as the transceiver 12 shown in FIG. 1.

In at least one such embodiment, the eNodeB may have a certain amount of transmit power available to it, for transmitting PHICH groups, and it may be that the aggregate power needed for transmitting a number of boosted ack signals in a given PHICH group exceeds the power allocation for PHICH transmission. In operation, the eNodeB may be configured to determine if a required transmit power for the group of ack signals exceeds a transmit power available for transmitting on the PHICH, and, if so, to increase a transmit power allocation for the PHICH. If the eNodeB has sufficient reserve power available, it may simply draw from that reserve power. On the other hand, if the amount of power needed for ack boosting cannot be allocated complete from freely available reserve power, the eNodeB may reduce the power allocated (or reserved) for one or more other types of signal As for implementing the above method (and variations of the above method), those skilled in the art will appreciate that the transceiver 12 may comprise an arrangement of control, processing, and communication circuits. FIG. 4 illustrates an example arrangement of circuits for the transceiver node 12, including receiver circuits 20, demodulation/decoding circuits 22, receiver processing/control circuits 24 (including an UL scheduler 26), one or more additional circuits 28 (such as system controller, application processors, user interface circuits, etc.). The transceiver 12 further includes transmitter processing/control circuits 30, including a retransmission control circuit 32, a power control circuit 34, and further includes coding/modulation circuits 36, and transmit circuits 38.

With particular emphasis on the above-described method and its variations, the transceiver 12 is configured for operation in the wireless communication network 10, and comprises receiver circuits 20 configured to receive signals from given ones in a plurality of remote transceivers 14, and decoding circuits 22 configured to decode the received signals. Further, the retransmission control circuit 32 is configured to generate nack signals for those received signals that failed decoding and ack signals for those received signals that passed decoding. Correspondingly, the power control circuit 34 is configured to set a transmit power level for at least one of the ack signals, based at least in part on the amount of channel resources allocated for transmission of the corresponding received signal, and the transmit circuits 38 are configured to transmit the ack and nack signals.

In at least one embodiment, the power control circuit 34 is configured to set the transmit power level to a nominal level if the amount of channel resources allocated for transmission of the corresponding received signal is below a defined allocation threshold, and set the transmit power level to a boosted level if the amount of channel resources allocated for transmission of the corresponding received signal is above the defined allocation threshold.

For example, the power control circuit 34 is configured to calculate the nominal level according to currently-estimated channel conditions for the associated remote transceiver 14 and a reception reliability requirement defined for ack signals (which may be defined according to the relevant air interface requirements of wireless communication standards), where the boosted level is greater than the nominal level. In one embodiment, the power control circuit 34 is configured to calculate the nominal level as a function of a known reception reliability requirement for ack signals and currently-estimated propagation channel conditions, and calculate the boosted level by upwardly adjusting the nominal level. Such adjustment can be a stepwise adjustment, or a proportional adjustment. Further, there may be varying amounts of boost, in dependence on the associated UL resource allocation amounts.

In at least one example embodiment, the power control circuit 34 is configured to set nominal transmit power levels for the ack signals corresponding to those received signals that had channel resource allocation amounts below a defined threshold amount, and set boosted transmit power levels for one or more of the ack signals corresponding to those received signals that had channel resource allocation amounts above the defined threshold amount.

As noted, in at least one embodiment, the transceiver 12 is an eNodeB operating in an LTE network, and the remote transceivers 14 are (LTE) user terminals (or user equipments, UE) transmitting user signals to the eNodeB on subframes of a Physical Uplink Shared Channel (PUSCH). In this setting, the eNodeB is configured to receive and decode given user signals in a given subframe of the PUSCH, and to set the transmit power levels for a corresponding group of ack signals to be sent by the eNodeB on a Physical Hybrid-ARQ Indicator Channel (PHICH). In at least one such embodiment, the power control circuit 34 is configured to determine whether a required transmit power for the group of ack signals exceeds a transmit power available for transmitting on the PHICH, and, if so, to increase a transmit power allocation for the PHICH.

Figure 5:
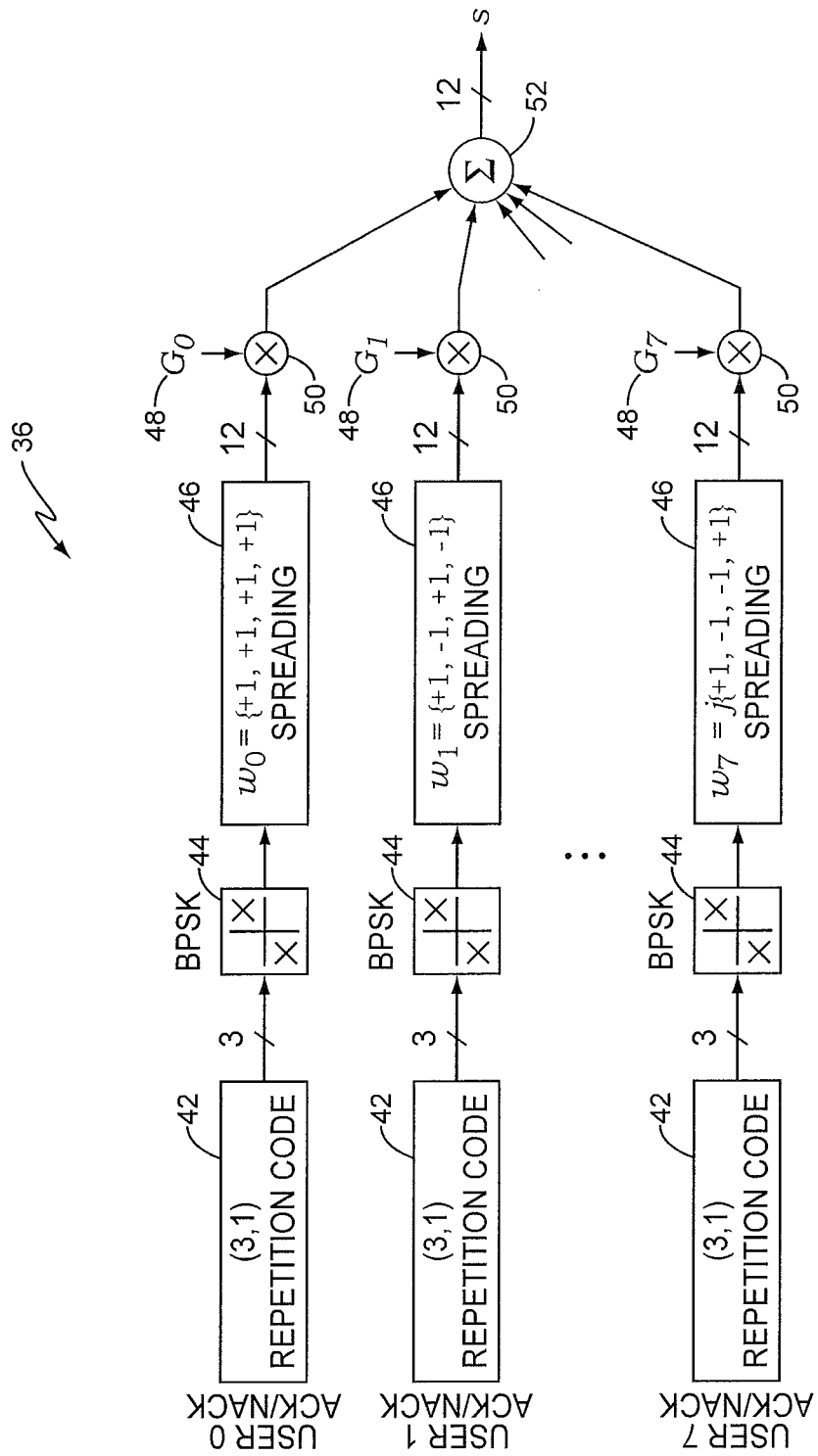
FIG. 5 is a block diagram of one embodiment of modulation/coding circuitry configured for boosting ack powers on a selective, per-user basis.

FIG. 5 partially illustrates one embodiment of the coding/modulation circuits 36, in which the above ack power level adjustment, or "ack boosting," may be performed. One sees an example where there are eight remote terminals 14 (also known as users, designated User 1 through User 7). Coding circuits 42 generate encoded ack or nack bits for each user, and each such set of coded bits is mapped to a corresponding BSPK symbol by mapping circuits 44. The resultant BPSK symbol for each user is then spread in a spreading circuit 46, and than amplified in a multiplier circuit 50, by a amplification scale factor $G_x$, where "x" corresponds to a respective one of the users. The amplified signals are then combined in a combining circuit 52, in preparation for transmit processing in the transmit circuits 38.

The value of $G_x$ can be manipulated to effect the desired boosting. For example, $G_x$ for user x can be computed according to the nominal power requirement, and then increased incrementally or proportionally. The boosting adjustment can be made in dependence on the amount of uplink resources that were allocated to the transmission from user x that is being acknowledged. Broadly, it may be the case that no boosting is done for relatively small allocations, while one or more levels of boosting are used for larger allocations. A non-limiting but significant advantage of this method is that higher reliability is used for acknowledging received signals that are associated with larger resource allocations, as the mistaken retransmission of such signals is potentially more disruptive. Further, given that there may be actual or desired limits on the aggregate transmit power allocable to PHICH group transmissions, it is a further advantage to selectively boost or not boost ack signals within a given group, based on the resource allocations associated with the signals being acknowledged. Doing so allows an eNodeB, for example, to intelligently save power and/or to remain within desired power budgets, while not causing significant communication link disruptions arising from mistaken retransmissions. That is, the eNodeB can send acknowledgments with "enhanced reliability" (power boosting), or with "nominal reliability" (nominal power with no boosting), or with "reduced reliability" (less than nominal power), all in dependence on evaluating the resource allocation amounts associated with the signals being acknowledged.

Figure 6:
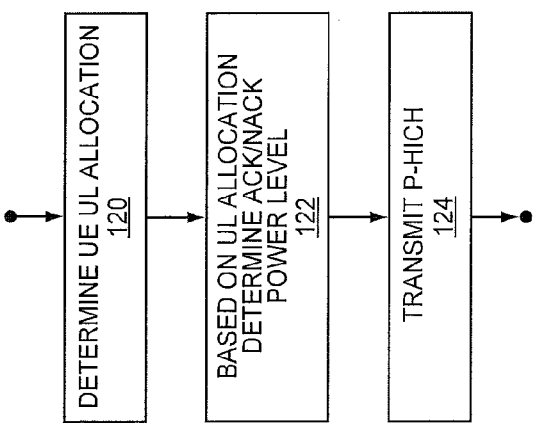
FIG. 6 is a logic flow diagram of one embodiment of ack power boosting, set in an LTE network context.

With such boosting control in mind, FIG. 6 illustrates one embodiment of ack power control implemented by one or more configurations of the transceiver 12. The illustrated processing includes determining the UL allocation for a given UE whose signal is being acknowledged (Block 120). The transceiver 12 then determines the ack power level of the ack signal for that UE, based on the UL allocation, and transmits the ack signal at the determined power level, in a PHICH group.

The processing of FIG. 6, and of the other method embodiments descried thus far, may be implemented via dedicated processing circuits and/or programmable processing circuits. For example, in one or more embodiments, at least a portion of the retransmission control and power control circuits 32 and 34 are implemented using computer-based processing circuits. That is, these circuits comprise one or more microprocessor-based circuits, including program and working memory, wherein the program memory stores one or more computer programs. The computer program(s), as held in the memory or other computer-readable medium within the transceiver 12, comprise program instructions that, when executed by the microprocessor-based circuits, specially configure those circuits to carry out the disclosed ack signaling power control method(s).

Figure 7:
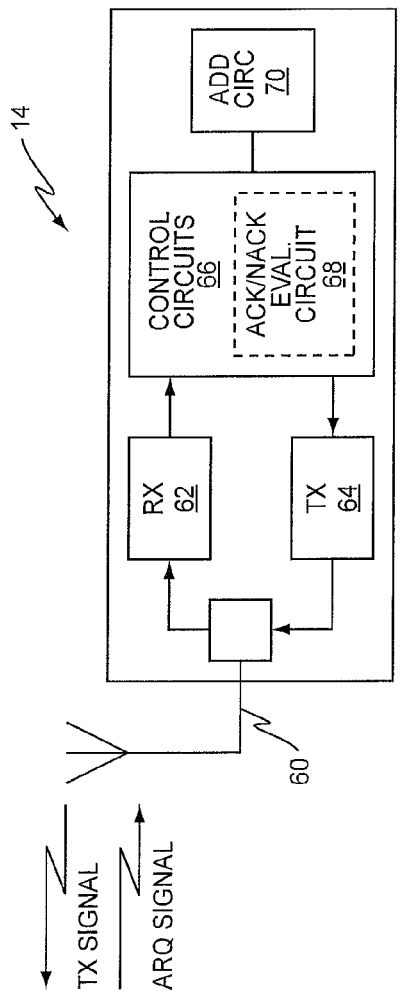
FIG. 7 is a block diagram of one embodiment of a terminal node, such as the transceiver 14 shown in FIG. 1.

Similarly, those skilled in the art will appreciate that each of the terminals 14 may itself be a relatively complex arrangement of control, processing and communication circuits. By way of non-limiting example, FIG. 7 illustrates one embodiment of a transceiver 14, which, as noted, may be a wireless communication terminal—such as a cellular telephone—or other wireless communication device. (Note that not all transceivers 14 need be alike, nor necessarily have the same capabilities.)

According to the illustration, a given transceiver 14 comprises one or more transmit/receive antennas 60 coupled to a receiver circuit 62 and a transmit circuit 64. The receiver and transmit circuits 62 and 64 are in turn coupled to a control circuit 66, which itself may comprise one or more processing circuits. At least in a functional circuit sense, the control circuit 66 includes an ack/nack evaluation circuit 68, and the transceiver 14 may include any number of additional circuits 70, such as system and/or application processors, user interface circuits, power control circuits, etc.

In one embodiment, at least a portion of the control circuit 66 is implemented using programmable circuitry, e.g., the control circuit 66 includes one or more microprocessor-based circuits having access to computer readable medium (e.g., a FLASH or EEPROM memory device). The computer-readable medium stores one or more computer programs comprising program instructions that, when executed by the microprocessor-based circuits, specially configures the transceiver 14 to carry out the method(s) taught herein.

Figure 8:
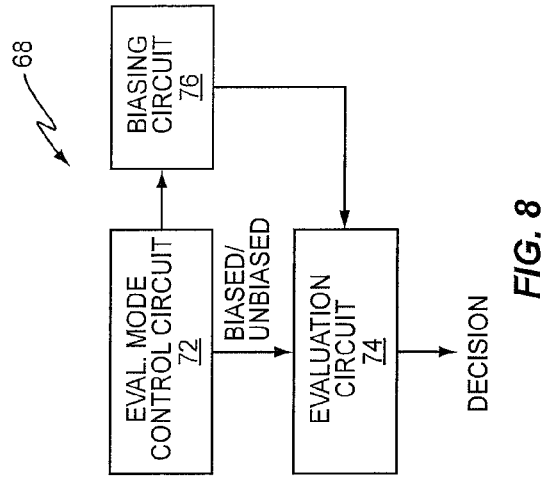
FIG. 8 is a block diagram of one embodiment of an ack/nack decision circuit that is adapted to (selectively) bias its ack decision making as a function of resource allocations made for the transmission being acknowledged.

As a particular example of that configuration, FIG. 8 illustrates a functional circuit arrangement for the ack/nack evaluation circuit 68, where the depicted processing elements may be implemented at least in part via the execution of stored computer program instructions by one or more digital processors. In any case, one sees an evaluation mode control circuit 72, which is configured to control whether the ack/nack evaluation circuit 68 operates in a mode where ack decision biasing is used or in a mode where ack decision biasing is not used. Also included are an evaluation circuit 74 and a biasing circuit 76. The evaluation circuit 74 is configured to make the actual ack/nack evaluation decision—i.e., to determine whether the received ARQ signal indicates a nack or indicates an ack. Complementing such operation, the biasing circuit 76 is configured to control or set the biasing for such decision making.

Thus, the transceiver 14, which may be a wireless communication terminal or other wireless communication device, comprises the transmitter 64, which is configured to transmit a first signal to a second wireless communication transceiver, and the receiver 62, which is configured to receive a corresponding ARQ signal in return. As a non-limiting example, the first signal is an uplink data signal sent on uplink resources scheduled or otherwise allocated by the transceiver 12, acting as the second wireless communication receiver.

The transceiver 14 further includes the control circuit 66, which is configured to evaluate the ARQ signal according to an ack/nack decision threshold, to decide whether the ARQ signal conveys an ack or a nack. When operating in a biased decision mode, the control circuit 66 selectively biases its ARQ signal evaluation toward the ack decision, in dependence on the amount of channel resources that were allocated to transmission of the first signal. Here, the "biased decision mode" should be understood as a mode of operation wherein ARQ signal processing is adjusted to bias the ack-or-nack detection of the receiver toward ack detection. This biasing therefore means that the receiver is more likely to interpret a received ARQ signal value as an ack, as compared to operation in an unbiased mode.

In one embodiment, the control circuit 66 is configured to determine when to operate in the biased decision mode by determining whether the second wireless communication transceiver sends acks with enhanced reliability (i.e., a boosting of the transmit power used for the acknowledgment signal, as compared to the transmit power needed to satisfy a nominal reliability target, for example), at least where larger amounts of channel resource allocations were involved in the corresponding transmissions by the first wireless communication transceiver. If not, the control circuit 66 operates in the biased decision mode, and otherwise operates in an unbiased decision mode, wherein the ARQ signal evaluation is not biased toward the ack decision.

In one such embodiment, the control circuit 66 is configured to receive control signaling via the receiver 62, indicating that the second wireless communication transceiver is configured to use enhanced reliability. For example, in the LTE example case, an eNodeB or other network entity sends control signaling, indicating whether the eNodeB is or is not using ack power boosting. Thus, terminals, like the transceiver 14, which are operating in the network, can determine whether or not to use ack decision biasing.

An alternative embodiment does not require explicit signaling. Instead, the control circuit 66 is configured to correlate the amounts of channel resources allocated for signal transmissions from the transceiver 14 to the transceiver 12 with received signal powers of the corresponding ARQ signals (from the transceiver 12), to detect whether the transceiver 12 boosts ARQ signal power in dependence on the amounts of channel resources that were allocated for the signal transmissions being acknowledged.

The above correlation, for determining the dependency between ack signal power and corresponding resource allocation amounts, is done taking current radio channel characteristics into account. For example, the received ack signal power is normalized with the radio channel estimates and the normalized values are correlated with the resource allocation associated with the signal being acknowledged. In this manner, the transceiver 14 can, over a number of ack signal receptions, develop an accurate determination between ack signal power and the resource allocation amounts associated with the signals being acknowledged.

Even where the transceiver 14 operates in a mode wherein the ack decision biasing is used, it does not necessarily bias every ARQ signal evaluation. Rather, the control circuit 66 is configured to selectively bias the evaluation of the received ARQ signal by not biasing the evaluation toward the ack decision if the amount of channel resources allocated for transmitting the first signal is below a defined threshold, and otherwise biasing the evaluation toward the ack decision. That is, for a given transmission from the transceiver 14 to the transceiver 12, the transceiver 14 does or does not bias its evaluation of the corresponding ARQ signal returned from the transceiver 12, based on whether the channel resources allocated for the given transmission were above or below a defined allocation threshold.

As for biasing the evaluation, the control circuit 66 uses any one or more biasing schemes. In one embodiment, the control circuit 66 is configured to selectively bias a signal detection statistic obtained from the received ARQ signal toward an ack value, and compare the biased signal detection statistic to the ack/nack decision threshold. For example, the "soft" detection statistic for the received the ARQ signal can be numerically adjusted toward the defined ack value. The control circuit 66 therefore is configured in one or more embodiments to add a numerical offset to the soft detection statistic obtained for the ack/nack symbol conveyed in the received ARQ signal.

FIG. 9 illustrates an implementation of the above embodiment, wherein a "biasing" circuit 80 included in the transceiver 14 operates on the ARQ signal detection statistic, to produce a biased detection statistic. The resulting biased detection statistic is evaluated, rather than the unbiased detection statistic.

In another embodiment, the control circuit 66 is configured to selectively adjust the ack/nack decision threshold to increase the likelihood of ack detection, and compare a signal detection statistic obtained from the received ARQ signal with the biased ack/nack decision threshold. FIG. 10 illustrates an embodiment according to this configuration.

One sees a decision scale bounded at one end by the nominal value of a ack symbol ($-\sqrt{E_{ack}}$), at the other end, by the nominal value of an nack symbol ($+\sqrt{E_{nack}}$). The ack/nack decision threshold may be set at the midpoint (0 value) between the ack and nack exemplary values of −1 and +1, where that midpoint setting is used for unbiased ack/nack evaluation. For biased decision making, the ack/nack decision threshold can be shifted in favor of the ack decision. In the example of FIG. 10, the decision threshold is shifted toward the nominal nack value, thereby increasing the likelihood that the detected value of the received ARQ signal is more likely to be interpreted as an ack.

Notably, as with the alternative approach of adjusting the decision statistic value, there may only be one value of bias adjustment, that is applied or not applied, in dependence on the operating mode of the control circuit 66 (and on any resource allocation thresholds that may be in used for controlling the bias/no-bias decision making). Conversely, in addition to deciding whether or not to apply biasing to the ack decision, the control circuit 66 may use varying amounts of biasing, such as in dependence on the channel resource allocation amounts of the transmissions for which the ARQ signal was received—e.g., the greater the allocation, the greater the biasing. Of course, the maximum amount of biasing may be capped, and there may be a minimum amount of biasing needed, to gain a useful improvement over unbiased ack detection.

Thus, in one or more embodiments, the control circuit 66 is configured to transmit a first signal and receive a corresponding ARQ signal in return, and to adjust the ack/nack decision threshold in dependence on the amount of channel resources that were allocated to transmission of the first signal.

As noted, transceivers 14 and 12 are, in at least one embodiment, a wireless communication terminal and a network node (eNodeB), respectively, configured for operation in an LTE network. Here, the transmitter 64 of the terminal 14 transmits, as said first signal, an uplink signal on a Physical Uplink Shared Channel (PUSCH), on particular channel resources allocated to the transceiver 14 for that transmission. Correspondingly, the terminal 14 receives the ARQ signal as a Physical Hybrid ARQ Indicator Channel (PHICH) signal from the transceiver 12. In such operations, the control circuit 66 may use greater biasing for greater allocations of channel resources, or may use fixed amounts of biasing.

With the above apparatus configurations in mind, FIG. 11 depicts an example of processing implemented at the transceiver 14, for carrying out and controlling ack/nack decision biasing. Particularly, FIG. 11 illustrates a method of ack/nack detection in a first wireless communication transceiver, e.g., the transceiver 14, comprising transmitting a first signal to a second wireless communication transceiver and receiving a corresponding ARQ signal in return (Block 130). The method continues with evaluating the ARQ signal according to an ack/nack decision threshold, to decide whether the ARQ signal conveys an ack or a nack (Block 132). When operating in a biased decision mode, that evaluation includes selectively biasing the evaluation toward the ack decision, in dependence on the amount of channel resources that were allocated to transmission of the first signal.

Further, the method may include determining when to operate in the biased decision mode by determining whether the second wireless communication transceiver sends acks with enhanced reliability, at least where larger amounts of channel resource allocations are involved. If not, the first wireless communication transceiver operates in the biased decision mode, and otherwise operates in an unbiased decision mode, wherein the evaluation is not biased toward the ack decision.

The method may include detecting whether the second wireless communication transceiver sends acks with enhanced reliability (at least where larger amounts of channel resources are involved for the transmissions being acknowledged) based on receiving control signaling indicating that the second wireless communication transceiver is configured to use enhanced reliability. Alternatively, the method includes inferring whether enhanced ack reliability is being used by the second transceiver.

One or more embodiments of the method detect whether acks are being sent with enhanced reliability based on correlating the amounts of channel resources allocated for signal transmissions from the first wireless communication transceiver to the second wireless communication transceiver with received signal powers of the corresponding ARQ signals. Such correlation processing is used to detect whether the second wireless communication transceiver boosts ARQ signal power for acknowledging signal transmissions from the first wireless communication transceiver, in dependence on the amounts of channel resources that were allocated for the signal transmissions being acknowledged.

For example, over a number of transmissions say, one-hundred or more—the first transceiver tracks the channel resource allocations made for its transmissions to the second transceiver, and correspondingly tracks the signal strength or power of the ARQ signals correspondingly received from the second transceiver. Such tracking may be based on maintaining a running record of allocations for its transmissions and corresponding received signal strengths or powers of the acks received for those transmissions. Normalization or other processing techniques (e.g., filtering) may be used to detect whether the second transceiver appears to be using boosted transmit power levels for acknowledging those transmissions from the first transceiver that are associated with larger channel resource allocations.

Figure 12:
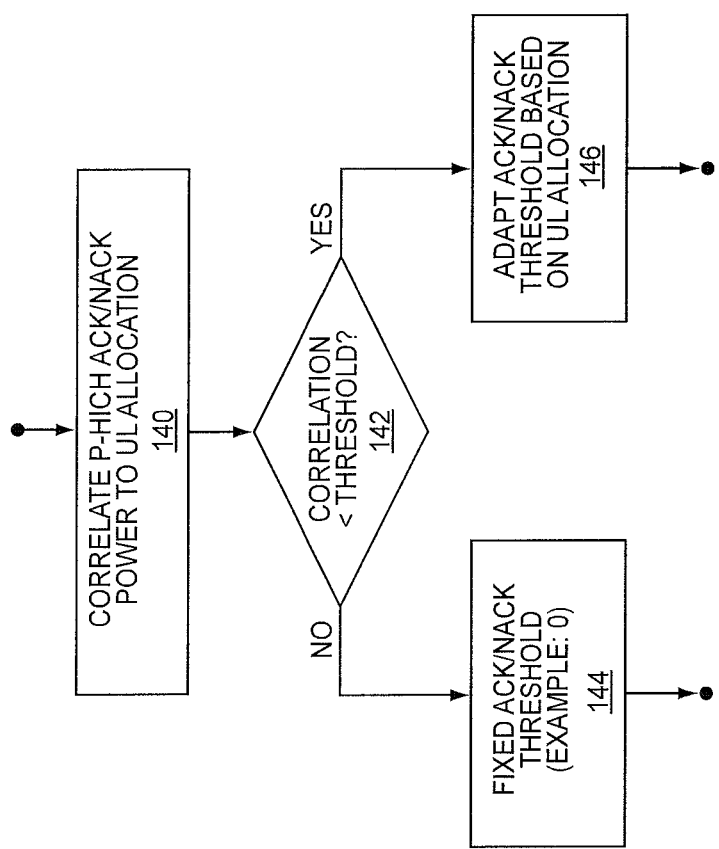
FIG. 12 is a logic flow diagram of one embodiment of a method of determining whether to operate in a first mode, where ack decision biasing is used, or a second mode, where ack decision biasing is not used.

FIG. 12 illustrates an LTE-based embodiment of such correlation-based tracking. In this context, the transceiver 14 transmits data signals to the transceiver 12 on the uplink, using varying amounts of uplink resource allocations, and receives corresponding ARQ signals in PHICH transmissions from the transceiver 12. Accordingly, the transceiver 14 correlates PHICH ack/nack power to the uplink resource allocations (Block 140).

Further, the transceiver 14 compares the correlation results to a defined correlation threshold (Block 142), which may be set in dependence on the particular design and operational considerations at hand. (The correlation threshold also may be dynamically adjusted or otherwise determined over time). As a non-limiting example, where a correlation value of zero equal no correlation between ack powers and corresponding UL resource allocations, and a value of one equal complete correlation, the correlation threshold may be set to a value of one-half or greater.

In any case, if the observed correlation between UL resource allocations and the corresponding ack powers is not below the correlation threshold (No from Block 142), the transceiver 14 concludes that the transceiver 12 is using enhanced reliability for acknowledging transmissions from the transceiver 14 that are associated with greater UL resource allocations. The transceiver 14 therefore decides that operation in the unbiased ack evaluation mode is appropriate—biasing is not needed, where ack reliability for high-risk acks is being boosted by the transceiver 12—and it therefore switches to (or remains in) the unbiased ack decision mode (Block 144).

On the other hand, if the observed correlation is above the defined correlation threshold (Yes from Block 142), the transceiver 14 concludes that the transceiver 12 is not using ack power boosting to enhance the reliability of acknowledging transmissions associated with greater amounts of UL resources. As such, the transceiver 14 switches to (or remains in) the biased ack decision mode of operation, wherein it biases the ack decision based on UL resource allocations (Block 146). In at least one implementation of the biased ack decision mode of operation, biasing is still selective. For example, the transceiver 14 does not bias its evaluation toward the ack decision if the amount of channel resources allocated for transmitting the first signal is below a defined (allocation amount) threshold. Conversely, if the allocation is above the threshold, it biases the evaluation toward the ack decision.

Broadly, then, a network transmitter may or may not use ack power boosting to enhance the reliability of reception for higher-risk acks at an associated remote terminal that is originating the transmissions being acknowledged. (Here, a "higher-risk" ack is an acknowledgment signal being used to acknowledge reception of a signal having a large resource allocation. Such ack signals are higher risk because a mistaken retransmission on a large resource allocation, as will occur if the ack is misinterpreted as a nack, will be disruptive to a potentially large number of other users subsequently assigned to those resources.) Further, the associated remote terminal may or may not use biased ack evaluation. Preferably, the network transmitter uses ack power boosting, and preferably, the associated terminal is configured to recognize that ack power boosting is in use, and therefore operate in the unbiased ack decision mode. Conversely, however, it is preferred that, upon recognizing or otherwise determining that the network transmitter is not using ack power boosting, the associated terminal operates in the biased ack decision mode.

In an LTE example embodiment, an eNodeB is configured to consider the risk of erroneous ack reception when allocating ARQ signaling powers within a given PHICH group. Here, a given ack poses more risk or less risk in dependence on the amount of uplink resources associated with the UE transmission being acknowledged. Relatively small allocations mean that an erroneous retransmission by the UE, caused by mistaking the ack for a nack, would not cause significant uplink interference at the eNodeB. Conversely, UE larger uplink resource allocations mean that any erroneous retransmission may cause significant uplink interference.

Thus, the risk associated with erroneously detecting an ack as a nack is based on the amount of uplink resources allocated to the uplink transmissions being acknowledged. The method can be implemented in the eNodeB and/or the UE. That is, in at least one implementation, the eNodeB is configured to adapt its ack transmission power depending on the allocated UL resources. Further, in at least one implementation, the UE is configured to determine whether the eNodeB is using ack boosting. If the UE determines that ack boosting is not being used by the eNodeB, the UE adapts its internal ack decision making, to bias the decision toward ack detection in dependence on the UL resource allocation amounts. Doing so lowers the risk that the UE will misinterpret an ack as a nack. Again, a good example advantage of this method is that there will be fewer instances of significant communication link disruptions at the eNodeB caused by UEs mistakenly retransmitting on large resource allocations.

Thus, the teachings presented herein teach that one transceiver can adapt (boost) the power it uses for acknowledging transmissions from another transceiver, in dependence on the amount (e.g., in bandwidth) of transmit resources allocated to those transmissions. In this manner, transmissions involving higher amounts of resource allocations are acked with greater reliability. Or, rather than boosting transmit powers for higher-risk acks, the transceiver that is receiving the acks can bias its ack decision making (at least for the high-risk acks), to favor the ack decision. Doing so decreases the risk that it will erroneously detect a transmitted ack as a nack.

For ack power boosting, the boosting can be done selectively, such as only when the resource allocation for the transmission being acknowledged is above a given threshold. Further, the boosting can be done using one level of boost, or a varying level of boost. Still further, boosting can be done stepwise, such as by using boost increments, or boosting can be done linearly, e.g., in proportion to the amount by which the resource allocation exceeds the threshold. As a refinement of the discrete boosting embodiments, resource allocations can be quantized into, e.g., large, larger, and largest categories, and different amounts of boost can be used in dependence on the allocation category determined for a given transmission that is being acknowledged.

Similarly, the ack decision biasing can be done linearly, in proportion to the resource allocations, or can be done stepwise, such as in increments. Still further, ack decision biasing also can be quantized or otherwise categorized. For example, a small bias adjustment can be used for ack signals associated with transmissions having resource allocations falling into a "small allocation" range, while a larger bias adjustment can be used for resource allocations falling into a "large allocation" range.

In any case, adjusting the ack decision bias comprises adjusting the ack/nack decision threshold (or the ack symbol detection statistic) in dependence on the amount of channel resources that were allocated to transmission of the first signal. For example, such biasing comprises using greater biasing for greater allocations of channel resources.

However, those skilled in the art will appreciate that these and other example details are provided for purposes of discussion, and are not intended to limit the present invention. Indeed, the present invention is not limited by the foregoing discussion, or by the accompanying drawings. Instead, the present invention is limited by the presented claims and their legal equivalents.

What is claimed is:

1. A method of transmitting automatic repeat request (ARQ) signaling from a wireless communication transceiver to respective ones of a plurality of remote transceivers, the method comprising:
   receiving signals from given ones of the remote transceivers and decoding them;
   generating non-acknowledgment (nack) signals for those received signals that failed decoding and acknowledgment (ack) signals for those received signals that passed decoding;
   setting a transmit power level for at least one of the ack signals based at least in part on the amount of channel resources allocated for transmission of the corresponding received signal; and
   transmitting the ack and nack signals;
   wherein setting a transmit power level for at least one of the ack signals comprises:
   setting the transmit power level to a nominal level if the amount of channel resources allocated for transmission of the corresponding received signal is below a defined allocation threshold; and
   setting the transmit power level to a boosted level if the amount of channel resources allocated for transmission of the corresponding received signal is above the defined allocation threshold.

2. The method of claim 1, wherein the nominal level is calculated according to currently-estimated channel conditions for the associated remote transceiver and a reception reliability requirement defined for ack signals, and wherein the boosted level is greater than the nominal level.

3. The method of claim 1, further comprising:
   calculating the nominal level as a function of a known reception reliability requirement for ack signals and currently-estimated propagation channel conditions; and
   calculating the boosted level by upwardly adjusting the nominal level.

4. The method of claim 1, wherein the wireless communication transceiver is a network node in a wireless communication network, and wherein the received signals are uplink user signals received from a plurality of wireless communication terminals supported by the transceiver node.

5. The method of claim 1:
   wherein the wireless communication transceiver comprises an eNodeB operating in a Long Term Evolution (LTE) network and the remote transceivers comprise user terminals transmitting user signals to the eNodeB on subframes of a Physical Uplink Shared Channel (PUSCH);
   wherein receiving signals from given ones of the remote transceivers and decoding them comprises, for a given subframe of the PUSCH, receiving and decoding given user signals; and
   wherein setting a transmit power level for at least one of the ack signals comprises setting the transmit power levels for a corresponding group of ack signals, to be sent by the eNodeB on a Physical Hybrid-ARQ Indicator Channel (PHICH).

6. The method of claim 5, further comprising determining if a required transmit power for the group of ack signals exceeds a transmit power available for transmitting on the PHICH, and, if so, increasing a transmit power allocation for the PHICH.

7. A wireless communication transceiver for operation in a wireless communication network, said transceiver comprising:
   receiver circuits configured to receive signals from given ones of a plurality of remote transceivers;
   decoding circuits configured to decode the received signals;
   a retransmission control circuit configured to generate non-acknowledgment (nack) signals for those received signals that failed decoding and acknowledgment (ack) signals for those received signals that passed decoding;
   a power control circuit configured to set a transmit power level for at least one of the ack signals based at least in part on the amount of channel resources allocated for transmission of the corresponding received signal; and
   transmitter circuits configured to transmit the ack and nack signals;
   wherein the power control circuit is configured to set nominal transmit power levels for the ack signals corresponding to those received signals that had channel resource allocation amounts below a defined threshold amount, and set boosted transmit power levels for one or more of the ack signals corresponding to those received signals that had channel resource allocation amounts above the defined threshold amount.

8. The wireless communication transceiver of claim 7, wherein the power control circuit is configured to calculate the nominal level according to currently-estimated channel conditions for the associated remote transceiver and a reception reliability requirement defined for ack signals, and wherein the boosted level is greater than the nominal level.

9. The wireless communication transceiver of claim 7, wherein the power control circuit is further configured to:
   calculate the nominal level as a function of a known reception reliability requirement for ack signals and currently-estimated propagation channel conditions; and
   calculate the boosted level by upwardly adjusting the nominal level.

10. The wireless communication transceiver of claim 7, wherein the wireless communication receiver is a transceiver node in a wireless communication network, and wherein the received signals are uplink user signals received from a plurality of wireless communication terminals supported by the transceiver node.

11. The wireless communication transceiver of claim 7, wherein the wireless communication transceiver is included in an eNodeB operating in a Long Term Evolution (LTE) network and the remote transceivers are included in user terminals transmitting user signals to the eNodeB on subframes of a Physical Uplink Shared Channel (PUSCH), and wherein the eNodeB is configured to receive and decode given user signals in a given subframe of the PUSCH, and to set the transmit power levels for a corresponding group of ack signals to be sent by the eNodeB on a Physical Hybrid-ARQ Indicator Channel (PHICH).

12. The wireless communication transceiver of claim 11, wherein the power control circuit is configured to determine whether a required transmit power for the group of ack signals exceeds a transmit power available for transmitting on the PHICH, and, if so, to increase a transmit power allocation for the PHICH.

13. A method of automatic repeat request (ARQ) signal detection in a first wireless communication transceiver comprising:
    transmitting a first signal to a second wireless communication transceiver and receiving a corresponding ARQ signal in return;
    evaluating the ARQ signal according to an ack/nack decision threshold, to decide whether the ARQ signal conveys an acknowledgment (ack) or a non-acknowledgment (nack);
    when operating in a biased decision mode, selectively biasing the evaluating toward the ack decision, in dependence on the amount of channel resources that were allocated to transmission of the first signal; and
    determining when to operate in the biased decision mode by:
        determining whether the second wireless communication transceiver sends acks with enhanced reliability, at least where larger amounts of channel resource allocations are involved;
        if the determining indicates that the second wireless communication transceiver does not send acks with enhanced reliability, operating in the biased decision mode; and
        if the determining indicates that the second wireless communication transceiver does send acks with enhanced reliability, operating in an unbiased decision mode in which the evaluating of the ARQ signal is not biased toward the ack decision.

14. The method of claim 13, wherein evaluating the ARQ signal comprises receiving control signaling indicating that the second wireless communication transceiver is configured to use enhanced reliability.

15. The method of claim 13, wherein evaluating the ARQ signal comprises correlating the amounts of channel resources allocated for signal transmissions from the first wireless communication transceiver to the second wireless communication transceiver with received signal powers of the corresponding ARQ signals, to detect whether the second wireless communication transceiver boosts ARQ signal power for acknowledging signal transmissions from the first wireless communication transceiver, in dependence on the amounts of channel resources that were allocated for the signal transmissions being acknowledged.

16. A first wireless communication transceiver comprising:
    a transmitter configured to transmit a first signal to a second wireless communication transceiver and a receiver configured to receive a corresponding automatic repeat request (ARQ) signal in return; and
    a control circuit configured to:
    evaluate the ARQ signal according to an ack/nack decision threshold, to decide whether the ARQ signal conveys an acknowledgment (ack) or a non-acknowledgment (nack); and
    when operating in a biased decision mode, selectively bias its ARQ signal evaluation toward an ack decision, in dependence on the amount of channel resources that were allocated to transmission of the first signal; and
    determine when to operate in the biased decision mode by:
        determining whether the second wireless communication transceiver sends acks with enhanced reliability, at least where larger amounts of channel resource allocations were involved in the corresponding transmissions by the first wireless communication transceiver;
    wherein if the determining indicates that the second wireless communication transceiver does not send acks with enhanced reliability, the control circuit operates in the biased decision mode; and
    wherein if the determining indicates that the second wireless communication transceiver does send acks with enhanced reliability, the control circuit operates in an unbiased decision mode wherein the ARQ signal evaluation is not biased toward the ack decision.

17. The first wireless communication transceiver of claim 16, wherein the control circuit is configured to receive control signaling via the receiver, indicating that the second wireless communication transceiver is configured to use enhanced reliability.

18. The first wireless communication transceiver of claim 16, wherein the control circuit is configured to correlate the amounts of channel resources allocated for signal transmissions from the first wireless communication transceiver to the second wireless communication transceiver with received signal powers of the corresponding ARQ signals, to detect whether the second wireless communication transceiver boosts ARQ signal power in dependence on the amounts of channel resources that were allocated for the signal transmissions being acknowledged.

* * * * *

UNITED STATES PATENT AND TRADEMARK OFFICE
CERTIFICATE OF CORRECTION

PATENT NO. : 8,693,352 B2  
APPLICATION NO. : 12/638451  
DATED : April 8, 2014  
INVENTOR(S) : Lindoff et al.

Page 1 of 1

It is certified that error appears in the above-identified patent and that said Letters Patent is hereby corrected as shown below:

On the title page, item 56, under "OTHER PUBLICATIONS", in Column 1, Line 2, delete "opertion," and insert -- operation, --, therefor.

In the Specification

In Column 2, Line 37, delete "$n_k$ CN (0, $N_0$)" and insert -- $n_k \sim CN(0, N_0)$ --, therefor.

Signed and Sealed this  
Second Day of September, 2014

Michelle K. Lee  
*Deputy Director of the United States Patent and Trademark Office*